(No Model.)
P. KOTLAREWSKY.
CURRENT METER.
No. 380,262. Patented Mar. 27, 1888.
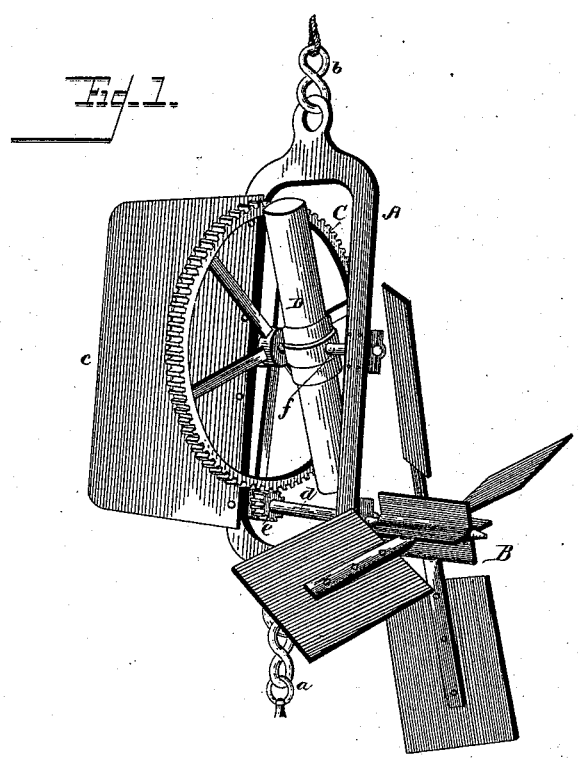
WITNESSES.
Edwin L. Yewell
John Enders, Jr
INVENTOR,
Paul Kotlarewsky,
by Marcellus Bailey
Attorney

UNITED STATES PATENT OFFICE.

PAUL KOTLAREWSKY, OF ST. PETERSBURG, RUSSIA.

CURRENT-METER.

SPECIFICATION forming part of Letters Patent No. 380,262, dated March 27, 1888.

Application filed December 7, 1887. Serial No. 257,233. (No model.)

*To all whom it may concern:*

Be it known that I, PAUL KOTLAREWSKY, of St. Petersburg, in the Empire of Russia, have invented a certain new and useful Improvement in Instruments for Measuring or Ascertaining the Velocity of Water and Air Currents, of which the following is a specification.

The instrument or apparatus to which my invention relates is one comprising, among other things, a propeller-like wheel which is revolved by the force of the current of liquid or fluid, and which when so revolved puts in revolution an axle or shaft. It has been customary heretofore to combine with these parts a registering mechanism geared to and operated by the said axle, and serving when thus actuated to register the number of revolutions of the propeller or its axle. Preliminary tests in currents of definite and ascertained velocity furnish the data from which the velocity indicated by any given number of revolutions per minute or other period of time can be computed and calculated, as will be readily understood without further explanation. Serious objections obtain against the use of registering or counting apparatus such as hitherto used in this connection. The apparatus itself is somewhat expensive and complicated and requires frequent attention and adjustment. The most serious objection, however, is that the numerous wheels which enter into the composition of the apparatus are apt to become clogged when the instrument is used in cold weather. Ice will form on the instrument and will get into the gearing, thus impeding its operation. Even a very minute piece of ice, which may readily escape the attention of the observer, will suffice to put a stop to the action of the mechanism, particularly when the current to be measured has no great velocity.

It is the object of my invention to remedy these and other objections which might be noted.

To this end I fix upon the shaft or axis of the propeller-wheel, or upon a shaft geared therewith, a hermetically-closed tube or receptacle, which is placed at right angles with the shaft, and preferably so that its longitudinal axis shall intersect the axis of said shaft. In this tube or receptacle I place a weight which is free to slide back and forth in the tube. The effect of this arrangement is, that as the shaft revolves, the weight will drop alternately toward opposite ends of the tube, and its stroke, as it brings up against either end, will be distinctly heard by the observer as well as felt by him if, as is usually the case, the apparatus when in use is held by him. By counting the strokes which occur during a given period of time the number of revolutions during that period can readily be ascertained, and from that the velocity of the current to be measured can be computed in the usual way.

The accompanying drawings represent an instrument embodying my improvement in its preferred form.

Figure 1 is a perspective view of the complete instrument. Fig. 2 is a longitudinal central section of the tube and weight contained therein.

The several parts of the apparatus are held and supported in a frame, A, provided at the bottom with a chain and hook, *a*, for attachment of the steadying-weight, (usually a weight of about sixteen kilograms,) and at the top with a like hook, *b*, for the attachment of the rope by which the apparatus is suspended in the water. It is also provided with a rudder, *c*, which will keep the rotation axis of the propeller in line with the direction of the current to be measured. In bearings in the frame is mounted the shaft *d*, on which is made fast the propeller-wheel B, the blades or wings of which (four in number in this instance) are shaped and arranged in any suitable or preferred known way, this forming no part of my invention. Fast on the shaft *d* is a pinion, *e*, which gears with and drives the large spur-wheel C on a shaft, *f*, the latter wheel having many times the number of teeth of the pinion *e*, so that the driving-axle *d* must make a large number of revolutions to one revolution of the driven axle *f*. The axle *f* is mounted to revolve in bearings on the frame A, and it is forked or divided, so as to straddle the metallic tube D, which is fast to and revolves with it and intersects its axis at right angles. In this tube is the sliding weight E. The tube, after the weight is put in it, is hermetically closed.

When the apparatus is submerged in water— for instance, suspended therein, as hereinbefore stated, by a rope held by the observer—it will at once adjust itself to the direction of the current. The force of the current, acting against the wings or blades of the propeller-wheel, puts the latter, and consequently the shaft $d$, in revolution, and from the latter rotary movement is communicated to the shaft $f$ through the gearing $e$ C. As shaft $f$ revolves, the tube D will be carried around, and the sliding weight, according to the position of the tube, will drop toward and bring up against alternately opposite ends of said tube, making two strokes for every revolution of shaft $f$. These strokes, as hereinbefore indicated, are to be counted by the observer, who can both hear and feel them, and in this way he can obtain data sufficient for the determination of the velocity of the current. By reason of the greater size of the spur-wheel C the shaft $f$ will revolve much more slowly than the shaft $d$, and this arrangement also has the effect of preventing to all practical intents and purposes any irregularity which might under other conditions result from the shifting of the weight E during the revolutions of the tube.

Having now described my improvement and the best way known to me of carrying the same into effect, what I claim herein as new and of my own invention is—

1. In apparatus for measuring or ascertaining the velocity of currents of water or air or other liquids or fluids, the combination, with the propelling or driving mechanism which is operated by the force of the current to be measured, of a tube or receptacle connected to and operated by said mechanism to revolve end over end, and a weight contained in said receptacle or tube and arranged and adapted to slide freely back and forth therein during said revolving movement, as and for the purposes hereinbefore set forth.

2. The combination, with the supporting-frame, the propeller-wheel, and its shaft or axle, of the shaft $f$, geared to the propeller-shaft in the manner described, so that it shall make but one revolution for a number of revolutions of the propeller-shaft, the tube D, secured to and carried by said shaft $f$, and the freely-sliding weight E, contained in said tube, under the arrangement and for operation substantially as hereinbefore set forth.

In testimony whereof I have hereunto set my hand this 8th day of November, A. D. 1887.

PAUL KOTLAREWSKY.

Witnesses:
N. PAWLOFF,
F. FRESHVITLY.